AUTOMATIC EQUALIZER FOR ANALOG CHANNELS HAVING MEANS FOR COMPARING TWO TEST PULSES, ONE PULSE TRAVERSING THE TRANSMISSION CHANNEL AND EQUALIZER
Filed July 15, 1965
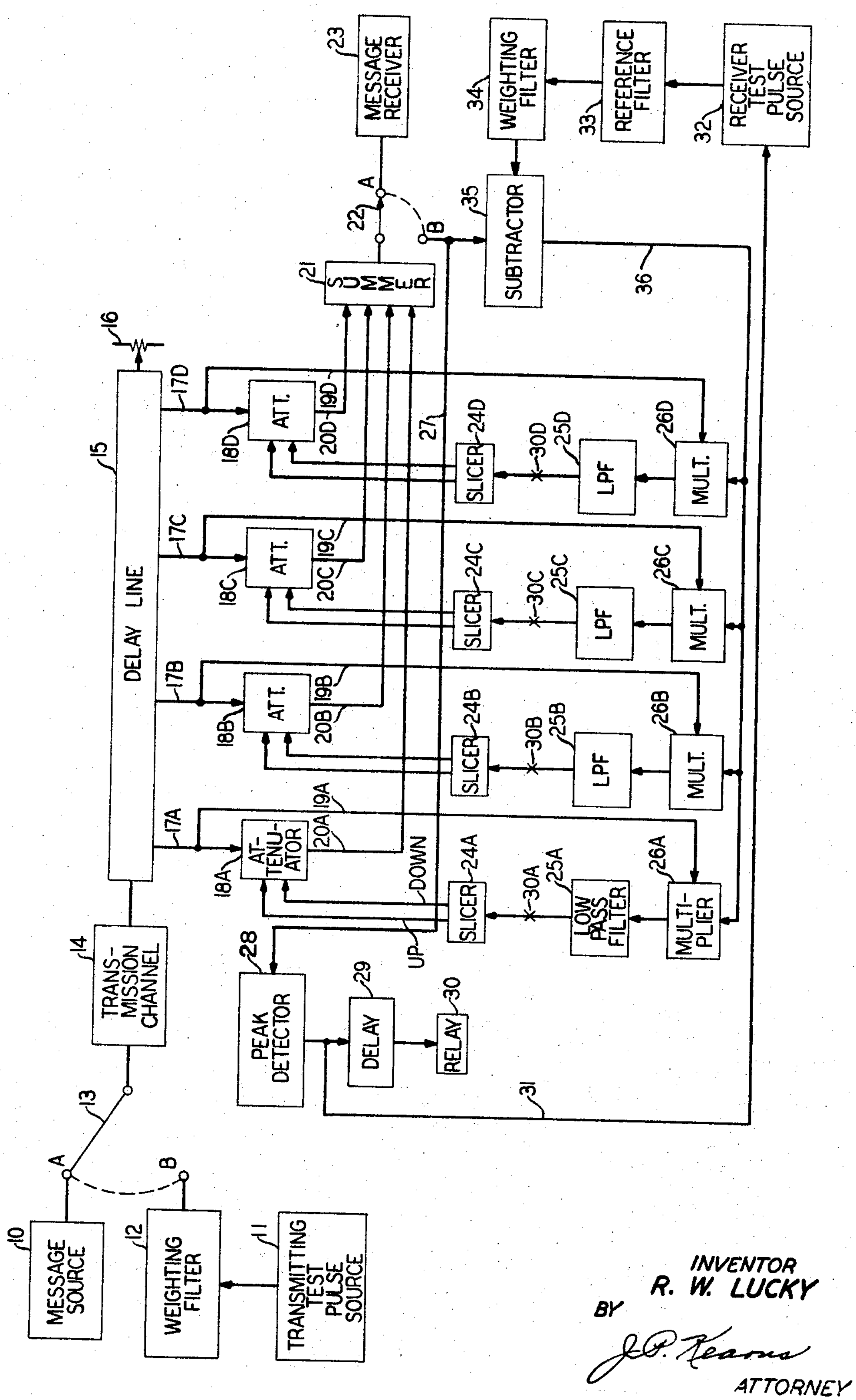
INVENTOR
R. W. LUCKY
BY J. P. Kearns
ATTORNEY United States Patent Office 3,375,473
Patented Mar. 26, 1968

3,375,473

AUTOMATIC EQUALIZER FOR ANALOG CHANNELS HAVING MEANS FOR COMPARING TWO TEST PULSES, ONE PULSE TRAVERSING THE TRANSMISSION CHANNEL AND EQUALIZER

Robert W. Lucky, Red Bank, N.J., assignor to Bell Telephone Laboratories, Incorporated, New York, N.Y., a corporation of New York Filed July 15, 1965, Ser. No. 472,146
9 Claims. (Cl. 333—18)

This invention relates to the correction of the distorting effects caused by transmission channels of limited frequency bandwidth on intelligence signals and in particular to the rapid automatic equalization of the amplitude and phase characteristics of such channels.

In the copending patent application of F. K. Becker, R. W. Lucky and E. Port, Ser. No. 396,836 filed Sept. 16, 1964, now Patent No. 3,292,110 the basic principle of an automatic equalization system employing a transversal filter of finite length in a data receiver to optimize at regular sampling instants the time-domain impulse response of a connected transmission channel of limited frequency bandwidth is disclosed. The minimization of intersymbol interference for synchronous digital data transmission is completed prior to message data transmission during a training period when test pulses are transmitted over the distorting transmission channel. During this period adjustable attenuator taps on the transversal filter are set to optimum values in response to polarity samples of the test pulses as they pass through the delay line portion or the filter. An iterative scheme of steepest descent increments of attenuator tap adjustments produces optimum equalization of a baseband pulse transmission system in the most direct manner.

It is an object of this invention to extend the techniques of the cited copending application to the automatic equalization of the frequency-domain phase and amplitude characteristics of analog transmission channels.

It is another object of this invention to employ a transversal filter to equalize the overall frequency response of a limited-bandwidth transmission channel and not merely its time-domain impulse response.

It is yet another object of this invention to employ a transversal filter to impart an arbitrary frequency response characteristic to a limited bandwidth transmission channel and thereby adapt the channel to the optimum transmission of asynchronous digital signals and of voice, facsimile, telemetry and other analog signals.

These and other objects are accomplished according to this invention by employing a transversal filter which includes a delay line tapped at uniform spacings determined by the frequency bandwidth over which equalization is required. Associated with each delay line tap is an adjustable attenuator. Attenuator outputs are combined in a common summation circuit and compared with a reference frequency response characteristic. Each attenuator is incrementally adjustable in step-by-step fashion over a range of plus and minus one by means of a reversible counter as described more fully in the cited copending patent application.

Identical test pulses are generated at the transmitting and receiving ends of the channel to be equalized. The transmitter test pulse traverses the channel to be equalized and the equalizer to be adjusted. The reference test pulse at the receiver in synchronism with the transmitter test pulse is passed through an idealized filter with a characteristic required for the equalized trnasmission channel. The two test pulses as respectively shaped in the transmission channel and the idealized filter are compared in a subtraction unit. The resultant error voltage is correlated with the outputs of the individual delay line taps to determine the directions of the incremental adjustments of the corresponding attenuators.

Successive samples of repeated test pulses lead to a steepest descent minimization of the means square error between the idealized filter characteristic and the equalized channel characteristic in the most expeditious manner.

For most transmission purposes, equalization at the edges of the transmission band is not as important as at the band center. It is generally impractical and costly to equalize the band edges with the same precision as the center. Therefore, weighting filters of substantially identical characteristic are additionally provided in series with both the transmitter test pulse source and the reference test pulse source at the receiver.

An important feature of this invention is that the reference filter at the receiver may advantageously comprise nothing more than the lead wiring between the reference test pulse source and the subtractor unit.

Another feature is that a substantially flat frequency response can be imparted to a transmission channel by digital techniques. No swept frequency test signals or oscillographic observations of the frequency response characteristic are necessary.

A particular advantage is flexibility. Any arbitrary overall characteristic can be established for a transmission channel by choice of reference filter characteristic. The longer the delay line used, the more precise is the correspondence of the final transmission channel characteristic with the desired characteristic.

Further objects, advantages and features of this invention will become apparent from a consideration of the following detailed description and the single figure of the drawing showing in block diagram form an illustrative embodiment of a system for automatically adjusting a transversal filter equalizer to correct the amplitude and phase characteristics of an analog transmission channel.

In the figure transmission channel 14 is intended to link message source 10 and message receiver 23 with the least possible distorting effect. A transversal equalizer including delay line 15 with its nonreflective termination 16, attenuators 18 and summer 21 is provided between channel 14 and receiver 23 to equalize the inherent distorting effects of transmission channel 14 on analog signals being transmitted between message source 10 and receiver 23. Delay line tapped outputs appear on leads 17. Connections from the attenuator outputs are made by way of leads 20 to summer 21.

The employment of transversal filters equalizers to correct the frequency domain characteristics of an imperfect channel is known from United States Patent No. 2,760,164 issued to R. S. Graham et al. on Aug. 21, 1956. The present invention lies in the provision of apparatus for arriving at optimum settings for the attenuators in such an equalizer responsive to digital test pulses. Optimum adjustment of the attenuators can result in an overall response characteristic for channel and equalizer which is flat in frequency and linear in phase.

The apparatus to accomplish this objective comprises—at the transmitter-transmitting test pulse source 11 and weighting filter 12; and—at the receiver-matching test pulse source 32, reference filter 33, weighting filter 34, subtractor 35, multipliers 26 for each of attenuators 18, low-pass filters 25, binary slicers 24, peak detector 28, fixed delay unit 29 and relay 30. Transmitting test pulse source 11 in series with weighting filter 12 is switched into circuit with transmission channel 14 by operation of arm 13 from contact A to contact B during a preliminary training period. At the same time arm 22 of a switch at the receiver is moved from contact A to contact B to connect subtractor 35 and the other adjustment apparatus at the receiver to the output of summer 21. By means of lead 27 at contact B of switch 22 peak detector 28 is connected to monitor the peak of the test pulse traversing the equalizer.

In the training set-up period thus effected substantially identical test pulses from transmitting source 11 and from reference source 32 are compared in subtractor 35 to obtain an error signal on lead 36. The test pulses from source 11 have passed through channel 14 and the transversal filter. Those from reference source 32 have passed through reference filter 33. The error signal at subtractor 35 is a measure of the departure of the actual response of channel 14 from an ideal or desired response provided by reference filter 33. A correlation of this error signal with the outputs from the several taps 17 on delay line 15 is effected in multipliers 26. For example, the delay line output at rightmost tap 17D is multiplied by the error signal on lead 36 in mulitplier 26D. Lead 36 is connected in common to one input of each of the other multipliers 26A through 26C. Consequently, the outputs of the other delay line taps 17A through 17C as well are correlated individually with the error signal.

The correlated signals from multipliers 26 are integrated over the period of time between test pulses in low-pass filters 25. The signals resulting from the integration are a measure of the gradient of the error with respect to a change in the corresponding attenuator setting. Upon slicing at the zero level in slicers 24 an output is obtained on one or the other of the up and down output leads in accordance with the polarity of the error gradient.

The gain of the corresponding attenuator 18 is then adjusted by an incremental step in a direction to offset the error gradient. By generating a series of test pulses the error signal can be brought down by the steepest path to a minimum value within the capacity of the number of delay line taps available.

Auxiliary timing apparatus is provided in peak detector 28 and delay unit 29. The reference pulse from source 32 must be generated so that its peak arrives at subtractor 35 at the same instant as the peak of the transmitted test pulse after traversing the equalizer. Peak detector 28 produces an output as soon as the peak of the transmitted test pulse emerges from summing circuit 21. This output triggers receiver test pulse source 32 over lead 31. It may be found convenient to delay the application of the output of peak detector 28 to reference test pulse source 32 to synchronize the present transmitted test pulse with a succeeding reference test pulse. Relay 30 operates from the output of peak detector 28 after a delay provided by delay unit 29 to close through contacts 30A through 30D low-pass filters 25A through 25D to slicers 24A through 24D and thereby quench their contents just before the correlation of the next test pulse takes place.

Information can be added to the equalization system to take into account the relative importance of errors at various frequencies. For example, in data transmission most of the signal energy is placed near the center of the frequency bandwidth of interest. Little signal energy is placed near the band edges and equalization error there has little relative importance. Equalization error is of no interest outside the bandwidth required by the message source to be used. Therefore, there may be inserted in series with each of test pulse sources 11 and 32 frequency weighting filters 12 and 34. These filters, preferably identical, assign a relative weight to any equalization error at a given frequency.

In a typical application the ideal characteristic desired to be supplied by reference filter 33 is flat amplitude and linear phase within the band of interest. Such a characteristic may be supplied in practice by no more than the connecting leads between test pulse source 32 and subtractor 35. Weighting filters 12 and 34 can exhibit any reasonable transfer function resembling the spectral density of a typical signal to be transmitted. A raised cosine function is exemplary. This function and others can be supplied by well known techniques.

The equalized channel characteristic is the product of the unequalized channel characteristic and the equalizer characteristic. The frequency characteristic of the equalizer is a periodic function which repeats at a frequency interval determined by the reciprocal of the time interval between taps on delay line 15. Therefore, such an equalizer can be used to correct not only the overall frequency response of a low-pass baseband channel but also that of a bandpass channel of the same frequency interval centered on a higher center frequency.

The precision with which the transversal filter accomplishes the equalization process depends on the number of delay line taps. Tests show about 13 taps are sufficient for equalization of a voice band transmission channel. The presence of noise in the transmission medium during the training period has no effect other than to extend the settling time and require the sending of more test pulses than otherwise.

While the analog automatic channel equalizer has been described herein in terms of a specific illustrative embodiment, it will be understood that numerous modifications will be suggested to those skilled in the art within the spirit and scope of the appended claims.

What is claimed is:

1. Apparatus for establishing optimum settings for the attenuators in a transversal equalizer intended for the correction of the frequency response characteristic of a band-limited transmission medium comprising
 - means at one end of said transmission medium transmitting a first series of test pulses through said medium and said equalizer,
 - means at the other end of said transmission medium generating a second series of test pulses in synchronism with said first series,
 - a reference filter having the frequency response characteristic desired for said transmission medium in tandem with said generating means,
 - means deriving an error signal from a comparison of said first and second series of test pulses,
 - means correlating said error signal with the inputs to the individual attenuators of said equalizer over the interpulse period,
 - means determining the polarity of the outputs of said correlating means, and
 - means responsive to said determining means adusting the settings of said attenuators incrementally in a direction opposite to said polarity.

2. The apparatus of claim 1 in which matching weighting filters are placed in tandem with each of said test pulse sources to render equalization errors at the edges of the transmission band of said transmission medium of less significance than those at midband.

3. The apparatus of claim 1 in which said second series of test pulses is maintained in synchronism with said first series of test pulses by a peak detector connected at the other end of said transmission medium.

4. The apparatus of calim 1 in which said reference filter is a lossless connection between said generating and deriving means.

5. The apparatus of claim 1 in which said deriving means comprises means for taking the difference between the output of said transversal equalizer and the output of said reference filter.

6. The apparatus of claim 1 in which said correlating means comprises a product modulator multiplying the error signal from said deriving means and individual delayed samples of the first series of test pulses traversing said equalizer and a low-pass filter for integrating the products from said product modulator over the period between test pulses.

7. The apparatus of claim 1 in which said polarity determining means comprises a zero-level threshold circuit having an output at one fixed amplitude for inputs below said zero level and at another fixed amplitude for inputs above said zero level.

8. In combination with a nonideal transmission channel and a transversal equalizer having a plurality of equally spaced taps, an adustable attenuator at each tap and a summing circuit common to the outputs of all attenuators, means setting said attenuators to produce a nearly ideal amplitude and phase frequency-response characteristic for said channel comprising a first test pulse source at one end of said channel, a second test pulse source at the other end of said channel, a reference filter in series with said second test pulse source having the ideal frequency-response characteristics desired for said channel, a subtractor taking the difference between the signal from said summing circuit due to a pulse from said first source traversing said channel and equalizer and the signal out of said reference filter due to a pulse from said second source, a product modulator multiplying difference signals from said subtractor by a signal from each of the taps on said equalizer to form product signals, and means responsive to a product signal from each modulator for incrementally adusting the multiplier associated with each tap on said equalizer in opposition to the sense of said product signals.

9. Apparatus for establishing optimum settings for the attenuators in a transversal equalizer to compensate the nonideal frequency response of a distorting transmission medium connected thereto comprising means transmitting a first succession of pulse test signals through a distorting transmission medium and into said equalizer, a plurality of equally spaced lateral taps in said equalizer, a plurality of attenuators one connectable in series with each of said taps, a common summing circuit for the outputs of all said attenuators, means generating a second succession of pulse test signals, means triggering said generating means in synchronism with the arrival of said first succession of pulse test signals at said equalizer, a reference filter having the ideal frequency response required for said transmission medium, means comparing said first and second succession of pulse test signals after traversal of said medium and equalizer and said reference filter, respectively, to obtain an error signal therebetween, means correlating said error signal with the outputs of the several taps of said equalizer, means integrating the correlated signals from said correlating means over an interpulse period, means slicing the integrated signals from said integrating means as an indication of the polarity of the error signal relative to the tap output, and means adusting each attenuator responsive to the polarity of the output of said slicing means in a direction to minimize said error signal.

References Cited

UNITED STATES PATENTS 3,283,063 11/1966 Kawashima et al. ---- 333—28 X

HERMAN KARL SAALBACH, *Primary Examiner.*

P. L. GENSLER, *Assistant Examiner.*